United States Patent [19]
Busse et al.

[11] Patent Number: 5,778,125
[45] Date of Patent: Jul. 7, 1998

[54] OPTICAL FIBER TERMINATIONS

[75] Inventors: Lynda E. Busse, Lorton; Frederic H. Kung, Alexandria, both of Va.; Jasbinder S. Sanghera, Greenbelt, Md.; Ishwar D. Aggarwal, Fairfax, Va.

[73] Assignee: The United States of America as represented by the Secretary of the Navy, Washington, D.C.

[21] Appl. No.: 739,985

[22] Filed: Oct. 30, 1996

[51] Int. Cl.$^6$ ................................................ G02B 6/36
[52] U.S. Cl. .......................... 385/80; 385/139; 385/78; 385/76
[58] Field of Search .................... 385/80, 62, 63, 385/60, 72, 85, 77, 76, 78, 81, 86, 87, 139

[56] References Cited

U.S. PATENT DOCUMENTS 4,303,304  12/1981  Ruiz ................................... 385/80
4,722,584  2/1988  Kakii et al. .......................... 385/80 X

*Primary Examiner*—Phan T.H. Palmer
*Attorney, Agent, or Firm*—Thomas E. McDonnell; George Kap

[57] ABSTRACT

An optical fiber termination connector includes an elongated structure with a chamber extending therethrough open at both ends, a fiber disposed in the chamber and spaced therefrom, a solid first material disposed in the chamber around the fiber, and an air gap in the chamber around the end of the fiber. The process includes the steps of locating a fiber in a chamber disposed vertically, with the end of the fiber extending beyond the lower portion of chamber; dipping a lower portion of the chamber into a first material in liquid form so that the first material enters the lower portion of the chamber to a level below an exit port located in the lower portion of the chamber; solidifying the first material disposed in and around the chamber and the fiber; above the solid first material; polishing the lower end of the fiber until it is flush with the chamber at the lower thereof; and removing the first material to form an air gap between the fiber and the lower portion of the chamber. The air gap is large enough to allow independent thermal expansion of the fiber.

20 Claims, 7 Drawing Sheets

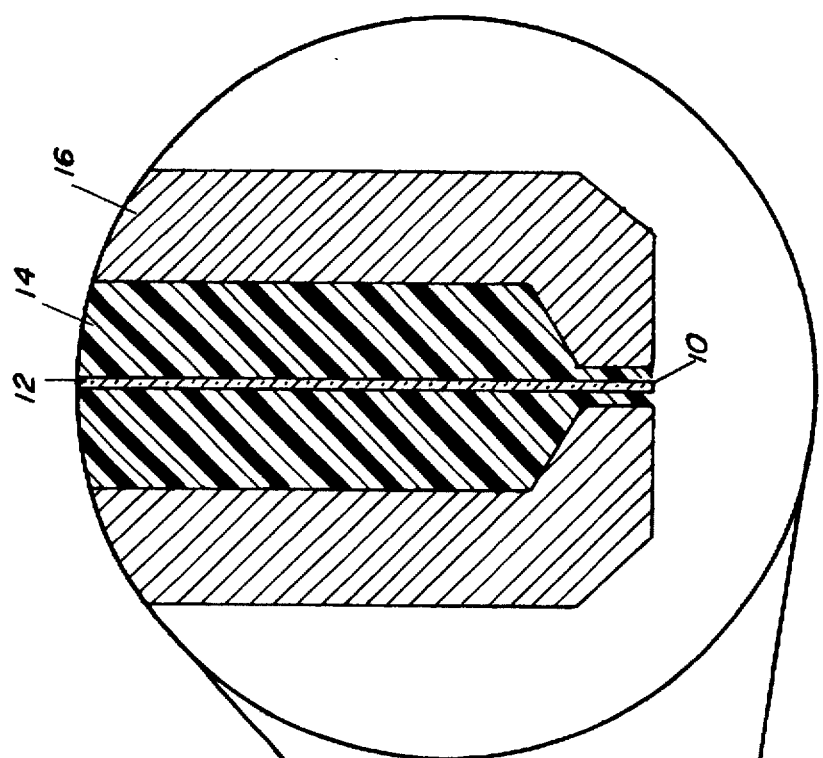
FIG. 1
PRIOR ART
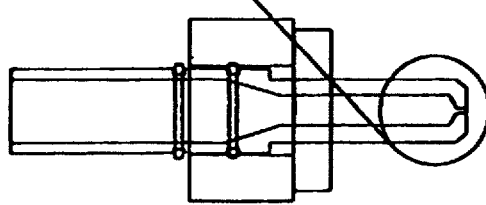
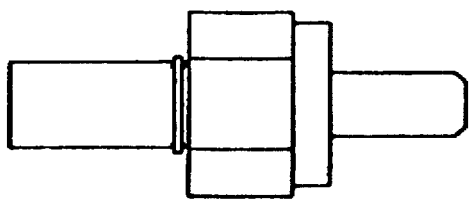

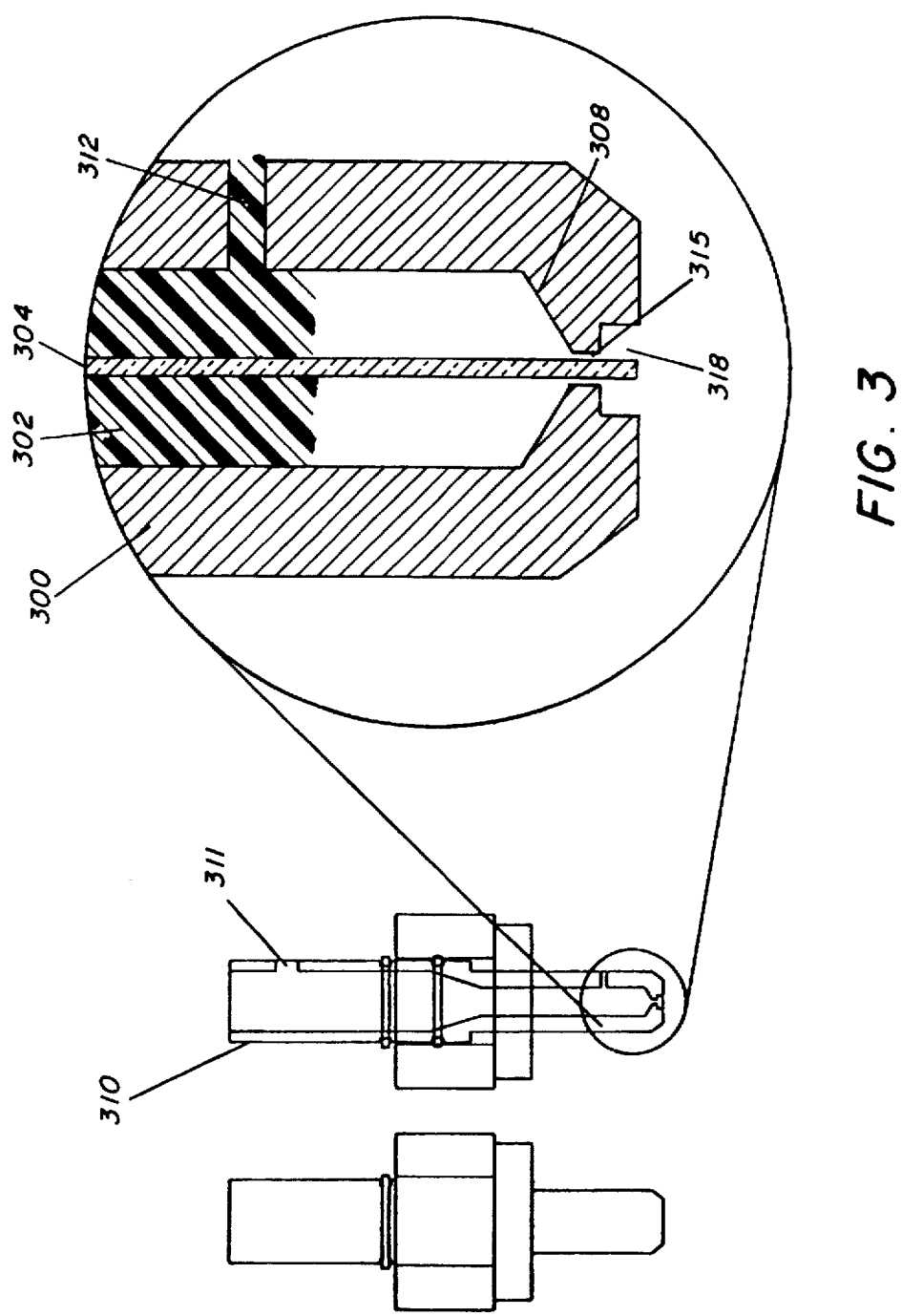

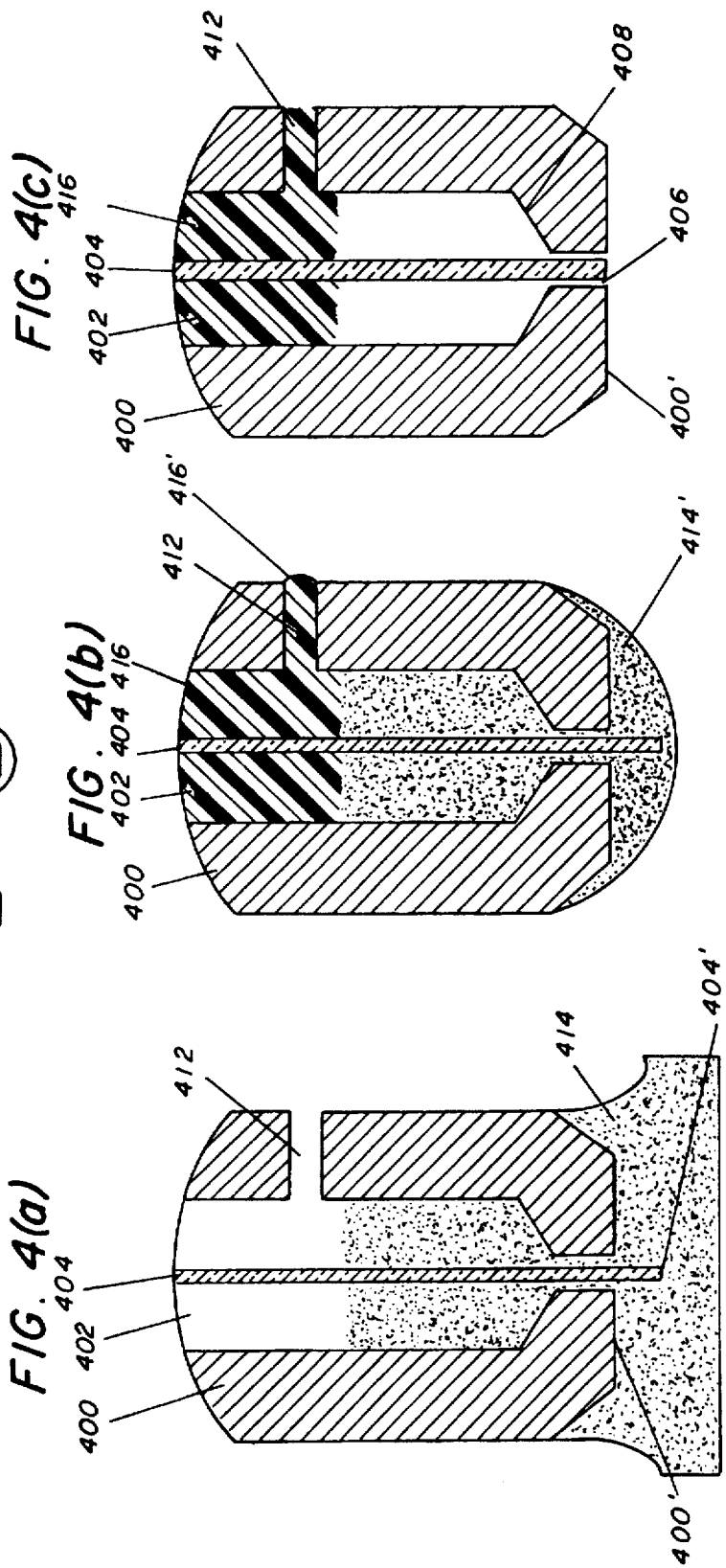

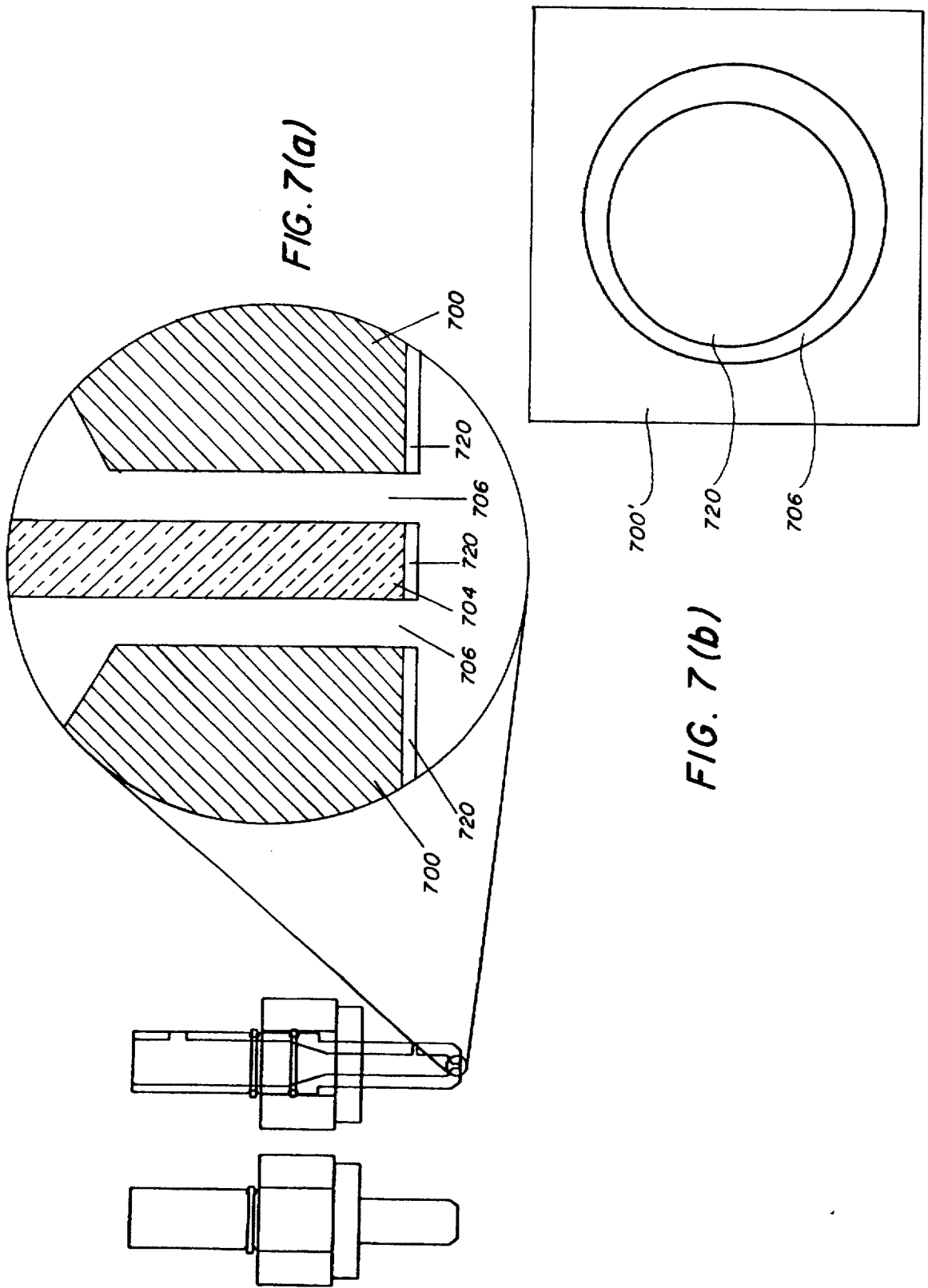

OPTICAL FIBER TERMINATIONS

BACKGROUND OF INVENTION

1. Field of Invention

This invention pertains to the field of optical fiber end terminations. Although this invention can be used to end terminate any fiber, it particularly pertains to termination of fibers other than silica fibers, such as chalcogenide, fluoride, polycrystalline, single crystal, and plastic fibers which have lower strength and/or have higher refractive index than silica fibers.

2. Description of Prior Art

Typical optical fiber cables are prepared with subminiature assembly (SMA) connector terminations in which the end of an optical fiber is inserted into an epoxy-filled ferrule and after the epoxy cures and hardens, the epoxy and fiber are polished until the fiber endface is flush with the connector endface and has a high optical quality finish. As shown in FIG. 1, reference numeral 10 is polished endface of fiber 12 with epoxy 14 surrounding the outer circumference of the fiber, which is then surrounded by connector 16. The connector is usually made of a metal, a metal alloy or a ceramic material.

For applications such as telecommunications, where low optical power propagates through the fiber, prior art terminations are often appropriate and ideal for mass production. Optical fibers of high refractive index, such as chalcogenide glasses, require AR coatings on their endfaces to reduce their high reflection losses. For instance, for a chalcogenide glass with a refractive index of 2.4, reflection loss is 17% per surface. Prior art connectors are not suitable when antireflection coatings are applied to the endfaces of the fiber. The antireflection coating process usually requires the fiber ends to be heated to elevated temperatures. Due to difference in the coefficient of thermal expansion between the fiber and the surrounding epoxy in a conventional SMA connector, upon cooling to room temperature, the antireflection coating may crack and flake away. FIG. 6(a) is a side view of the end tip of a prior art connector where is shown the lower part of cylinder 600, the second material 616, and the lower portion of fiber 604. Thickness of the proprietary antireflective coating 620 is about 1 to 2 microns and it is believed that the coating is applied by an ion assisted electron beam deposition. The antireflective coating 620 is disposed on the lower edge of cylinder 600, the endface of fiber 604, and the lower edge of second material 616. When applying the antireflective coating 620 to the endface of fiber 604, temperature of fiber 604 rises to about 100° C. and causes cracking and flaking 630 of the coating upon cooling at the boundary between the different materials due to coefficient of thermal expansion mismatch. FIG. 6(b) shows a section of antireflective coating 620 missing as a result of heating of the fiber during the coating application and the coefficient of expansion mismatch between the fiber 604, stainless steel cylinder 600, and epoxy second material 616. Coefficient of thermal expansion of the associated materials is as follows:

| stainless steel | 1.7 × 10⁻⁵ cm/cm/°C. |
| Tra-Bond F 112 epoxy | 6.0 × 10⁻⁵ cm/cm/°C. |
| As₂S₃ chalcogenide fiber | 2.5 × 10⁻⁵ cm/cm/°C. |

For other than low power propagation applications, however, it is deleterious to have a low melting material surrounding the endface of a fiber. These other applications, which are not well served by prior art terminations, include, but are not limited to:

(1) high optical power propagation through a fiber; and (2) fibers requiring antireflection (AR) coatings on the fiber endfaces for optimum transmission.

In the case of high power propagation, as shown in FIGS. 5(a) and 5(b), the input and output endfaces can undergo heating due to high optical power intensities at the endfaces, causing the surrounding epoxy 502 in the conventional SMA connector 500' to melt, form bubbles 503 and redeposit epoxy on the fiber endface 504' and cause damage and poor transmission.

Although fiber optic termination connectors without material surrounding the fiber endfaces have been made for silica fibers, one of the methods described to remove the material surrounding the fiber involves drilling it away with the fiber in the connector, which is not suitable for more fragile fibers. Another technique for terminating optical fibers involves the use of a thermoplastic adhesive to hold the fiber in the connector. According to U.S. Pat. No. 4,984,865, this thermoplastic adhesive has a softening temperature of over 200° C. Since many fibers of interest today, such as the chalcogenide fibers, possess softening temperatures below 200° C., the use of such an adhesive in a connector would be prohibitive for fibers with low softening temperatures.

Patents which describe techniques to affix a fiber end for high power laser applications include U.S. Pat. Nos. 4,762,385 and 4,676,586, however these patents do not address a process to prepare the fiber ends by an in situ polishing process. Crimp and cleave connectors, of U.S. Pat. Nos. 5,013,122 and 5,381,500, require that the fiber be cleavable and strong enough to have a metal piece crimped onto the outside surface of the fiber/buffer. Such connectors are not feasible for fibers with lower compressive strength, such as those based on chalcogenide or fluoride glasses. In addition, polishing is necessary for large diameter fibers to be useful for high power propagation and since these fibers are delicate, handling thereof must be kept to a minimum.

SUMMARY OF INVENTION

An object of this invention is to provide termination connectors for optical fibers without cracking antireflection coatings subsequently provided on endfaces thereof.

Another object of this invention is to provide terminations on endfaces of optical fibers by an in-situ process whereby effects of coefficient of expansion mismatch are avoided.

Another object of this invention is optical fiber terminations for silica, chalcogenide, fluoride, polycrystalline, single crystal, and plastic fibers for which terminations do not incur undue optical losses.

Another object of this invention is to provide termination connectors for optical fibers without which high optical power is transmitted, without subsequent damage which occurs to the endface in conventional connectors due to low melting material around the endface.

These and other objects of this invention are accomplished by the product and the in-situ process disclosed herein which are used to provide end terminations without the problems of the prior art characterized by an air gap around the tip of an optical fiber.

BRIEF DESCRIPTION OF DRAWINGS

FIG. 1 is a schematic represention of a prior art apparatus for providing end termination of an optical fiber.

FIG. 3 is a schematic representation of an alternate embodiment of the apparatus for providing end termination of an optical fiber characterized by the fiber centering feature.

FIGS. 4(a), 4(b) and 4(c) illustrate the in-situ process for providing optical fiber termination, with what is believed to be a connector presented above FIG. 4(b), wherein FIG. 4(a) shows the feature of immersing one end of the apparatus with the fiber therein in a first material, FIG. 4(b) shows the feature of providing a second material around the fiber, and FIG. 4(c) illustrates the process after polishing the fiber along with the first material and connector, and subsequent removal of the first material and creation of an air gap between the fiber and the apparatus at one end of the fiber.

FIG. 6(a) is the side view and FIG. 6(b) is the end view which more realistically shows the cracking and spalling effects of coefficient of expansion mismatch.

FIGS. 7(a) and 7(b) illustrate side and end views of the practice of this invention of providing an air gap around an end of an optical fiber with an antireflection coating on its endface, the fiber being disposed in a connector. FIG. 7(a) is the side view and FIG. 7(b) is the end view which more realistically shows the beneficial consequences of removing the coefficient of expansion mismatch.

DESCRIPTION OF PREFFERED EMBODIMENTS

This invention pertains to a product and a process for making the product using apparatus and process disclosed herein. The product is a connector for terminating optical fibers, particularly non-silica fibers, and includes a structure having an elongated chamber therein, a fiber disposed within and spaced from the walls of the chamber having endface of high optical quality flush with the lower extremity of the structure, a solid material disposed in the chamber around the fiber, and an air gap around one end of the fiber that is flush with one end of the structure.

The apparatus is characterized by a connector structure having an elongated chamber wherein is disposed an optical fiber in spaced relationship. The chamber is open at both ends and has inlet and outlet side ports for injecting a material thereinto around the fiber and exhausting or displacing air therefrom. An alternate embodiment is provided with feature that positions or centers the fiber within the chamber axially.

The process for terminating an end of an optical fiber involves positioning the fiber within the chamber of a vertically disposed connector used for fiber terminations, providing a removable or first material around the lower end of the fiber which material partly extends into the chamber before its removal, enveloping remainder of the fiber in a permanent or second material within the chamber, polishing the endface of the fiber and the first material until the fiber endface and the first material are flush with the lower extremity of the connector, and removing the first material in order to create an annular air gap between the fiber at its lower end and the chamber.

Figure 2:
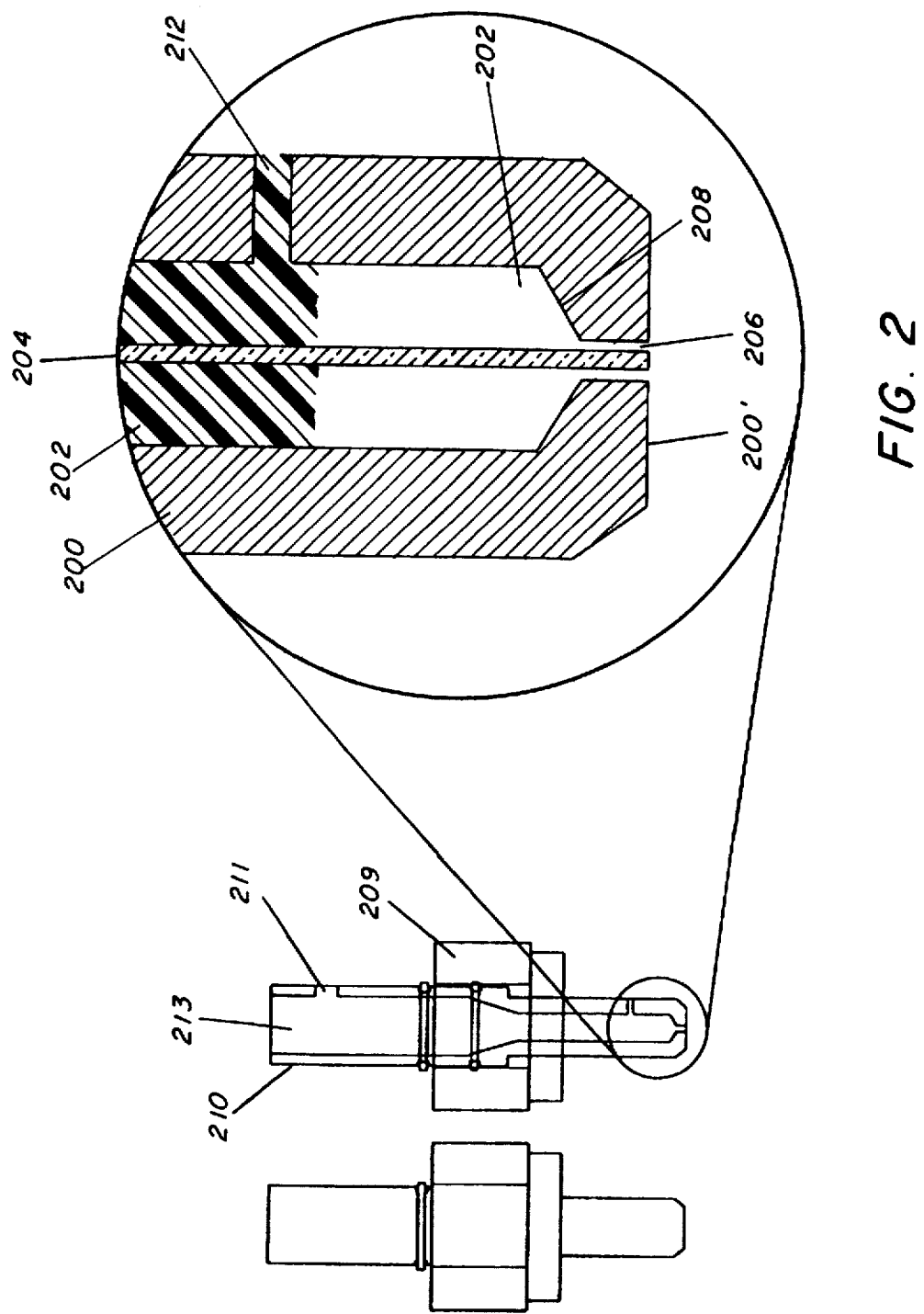
FIG. 2 is a schematic representation of apparatus of this invention for providing termination of an optical fiber.

The connector apparatus, which is typically metallic or ceramic but can be made of any other suitable material, is shown in FIG. 2 wherein elongated cylinder 200 defines chamber 202 for disposing optical fiber 204 therein axially and spaced from the walls of the cylinder. The apparatus is typically disposed in a vertical plane, as shown in FIG. 2. Although chamber 202 can be of a uniform diameter, typically it has a narrow annular section or passage 206 defined by frusto-conical section 208 which diminishes in diameter in a downward direction. Above the nut 209 is cylinder 210 with inlet port 211 for introducing a material into chambers 213 and 202, where exit port 212 allows air to escape from chamber 202. Inlet port 211 is typically larger than exit port 212 and is disposed above exit port 212. Ports 211 and 212 are typically provided in the same vertical plane. Ideally, port 212 would be located closer to passage 206 than shown in FIG. 2. Port 212 is provided in the lower section of cylinder 200 at or just above frusto-conical section 208. Chamber 202, fiber 204, and section 206 are typically coaxial.

Outside diameter of an optical fiber consisting of a core enveloped by a cladding is typically within the range of 50–2000 microns, more typically 100–1000 microns with core diameter being typically up to 90% thereof, more typically 30–70%, with remainder being the cladding. Vertical extent of cylinder 200 below nut 209 is typically 0.5–15 mm, more typically 4–8 mm, and its outside diameter should be sufficient to withstand manual pressure without crushing, this typically being about 3 mm.

Diameter of chamber 202 within cylinder 200 should be sufficiently large to affix fiber 204 therein after flowing a material thereinto and solidifying it therein. Diameter of chamber 202 depends on the diameter of fiber 204 disposed therein, with a larger or thicker fiber requiring a larger diameter chamber and the opposite being true for a smaller or thinner fiber. Typically, diameter of chamber 202 is 50–5000 microns, more typically 100–3000 microns, and especially about 1500 microns. Width of narrow annular section 206 can be such as to draw by capillary action a liquid into chamber 202 when the lower end of cylinder 200 is dipped into the liquid, although this is not a prerequisite. Typically, width of the annular section 206 is 5–200 microns, more typically 10–100 microns. The air gap extends along and around the fiber for a vertical distance of 50–5000 microns, more typically 200–2000 microns from the lower extremity of the structure. Port 211 should be large enough to introduce liquid material into chamber 202. Typically, inlet port 211 is an opening 100–4000 microns in diameter, more typically 500–2500 microns. Air port 212 should be large enough to exhaust trapped air in chamber 202 when it is filled with a material. Typically, exit port 212 is an opening 50–1000 microns in diameter, more typically 100–500 microns in diameter.

FIG. 3 illustrates an alternate embodiment of the connector apparatus which is similar to that shown in FIG. 2 with one exception—the embodiment of FIG. 3 has a feature for axially positioning the fiber within the chamber. As shown in FIG. 3, optical fiber 304 is axially disposed within chamber 302 of cylinder 300, with port 311 being provided in the wall of cylinder 310 above port 312. Frusto-conical section 308 provided at the lower extremity of the apparatus narrows chamber 302 to passage 315 which is just wide enough to allow passage of fiber 304 therethrough and of sufficient vertical extent to position fiber 304 within chamber 302. Typically, the fiber is axially positioned within the chamber to allow for material around it. Below passage 315 is counterbore 318 which forms an open annular air gap around the lower end of fiber 304. The counterbore 318 is of a larger diameter than passage 315.

Typically, width or outside diameter of passage 315 is 50–2000 microns, more typically 100–1000 microns, and its vertical extent is 100–3000 microns, more typically 250–1500 microns.

The in-situ fiber termination process is described in connection with FIGS. 4(a), 4(b) and 4(c). The process is commenced by passing an optical fiber 404 through chamber 413 into chamber 402 in cylinder 400 provided with inlet and outlet ports 410, 412 respectively, and frusto-conical section 408 at its lower extremity. The fiber is concentrically disposed in the chamber so that its lower extremity 404' extends beyond or is below lower extremity 400 of cylinder 400. In this disposition, the lower portion of cylinder 400' is dipped into first material 414 in liquid form so that first material 414 surrounds the fiber and is either drawn into chamber 402 by capillary action along the fiber or seeks its own level and thus enters chamber 402. Level of first material 414 in chamber 402 should be below exit port 412 since port is used to exhaust air therefrom when the chamber is filled with a second material, and typically port 412 is 300–7000 microns, and more typically 1000–3500 microns, above extremity 400' of cylinder 400.

The first or removable material can be any material that has a liquid and solid phases and that can be easily converted from liquid to solid and vice versa at temperatures below the fiber softening temperature. The first material is typically a material that is solid at about room temperature and converts to a liquid at an elevated temperature below about 100° C., more typically in the temperature range of 40–90° C. Conversion of the first material should not interfere with the type of optical fiber employed since, for example the Tg of a high purity silica glass is 1300° C., Tg of ZBLAN fluoride glass is 265° C., and Tg of $As_2S_3$ chalcogenide glass is 200° C. A means for removing the first material can be used which relies that it be soluble in a common solvent in which the fiber material is insoluble, which would not require any heating of fiber or first material. Examples of suitable first material include phenyl salicylate, wax resin Quick Stic, and CrystalBond 509.

After dipping the lower portion of cylinder 400' in first material 414 in liquid form, the first material is solidified to form solid bead 414 around lower extremity of fiber 404 and in chamber 402 and around cylinder 400, as shown in FIG. 4(b). Then, chamber 402 around fiber 404 is slowly filled through inlet port 411 with second material 416 in liquid form. As chamber 402 is filled with the second material in liquid form, air in the chamber escapes through exit port 412 and as more of the second material enters the chamber, some of it may pass through port 412 and form bead 416' on solidification. When chamber 402 around fiber 404 is partly or completely filled with second material 416 in liquid form, the second material is solidified. Sufficient amount of the second material should be introduced into the chamber and the chamber should be of sufficient width and vertical extent to rigidly anchor the fiber within the chamber. During filling of the chamber with the second material with aid of a syringe, for example, contact between the syringe and the fiber should be avoided.

The second or permanent material can be any material that has liquid and solid phases and which can be converted from liquid to solid. The second material is typically liquid at room temperature and converts to a solid, at a temperature below the melting temperature of the first material, such as room temperature, by means such as polymerization or other means. If the first material is removed by melting and/or by chemical means, as by solubilization, the second material in solid phase should not soften at melting or softening temperature of the first material and should be inert to anything that may be used on the first material in order to remove or facilitate its removal. Another suitable second material is one that gels at room temperature and cures at elevated temperature below the softening temperature of the fiber. Examples of suitable second material include room-temperature-curable epoxies such as EP-30 epoxy, Tra-Bond F112 epoxy, and Tra-Bond 2113 epoxy, and higher temperature curable epoxy such as heat resistant epoxy RP4036R.

After filling chamber 402 partly or completely with second material 416, the next step is solidifying the second material in any manner possible and removal of any solidified second material that protrudes from exit port 412. If a room-temperature-curable epoxy or another thermosetting resin is used as the second material, it is liquid at room temperature which facilitates flowing thereof into chamber 402 and solidification thereof in chamber 402 at room temperature with the aid of a curing agent. After solidification of the second material 416 in chamber 402, which anchors the fiber, fiber endface 404' and the solidified bead of the first material are polished using standard polishing techniques to a point where the lower extremity 404' of fiber 404 and the solidified bead of the first material are flush with the lower extremity 400' of cylinder 400. At this point, the first material is removed, in any suitable manner, to provide around the lower extremity of fiber 404 annular air gap 406, as shown in FIG. 4(c). The annular air gap should be large enough to allow for independent thermal expansion of fiber 404 relative to thermal expansion of cylinder 400 surrounding and being spaced from fiber 404. Typically, the air gap extends from lower extremity 400' of cylinder 400 along and around the fiber to the height of port 412.

If a material, such as phenyl-salicylate, is used as first material 414, although it is solid at room temperature, it is melted by heating it to about 60° C. and in the molten condition it is used when the lower extremity of the connector is dipped into the first material. The first material, i. e., phenyl salicylate, is then solidified by cooling until it becomes solid. Phenyl salicylate at the lower extremity of the connector in solid form is removed typically by heating it to about 60° C., at which temperature it becomes liquid and flows out. Phenyl salicylate can also be removed by a combination of heat and solvent.

Figure 5B:
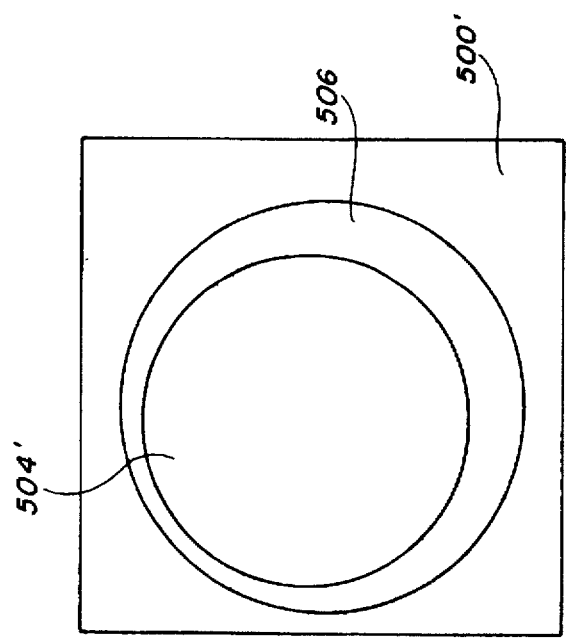
FIGS. 5(a) and 5(b) is a comparison of having a material around the end of the fiber and having an air gap there, with FIG. 5(a) illustrating the prior art practice of having a material around the fiber end and consequences thereof when high optical energy was transmitted through the fiber and FIG. 5(b) illustrating the practice of this invention of providing an air gap between the fiber and the apparatus, under similar conditions as in FIG. 5(a).
Figure 5A:
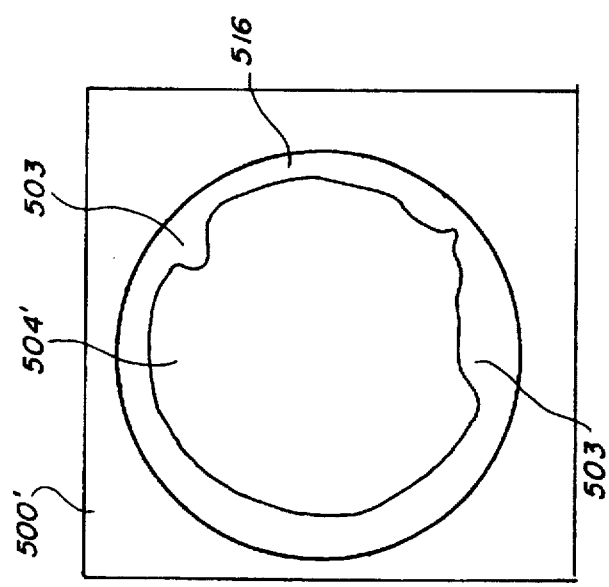
Figures 6A, 6B:
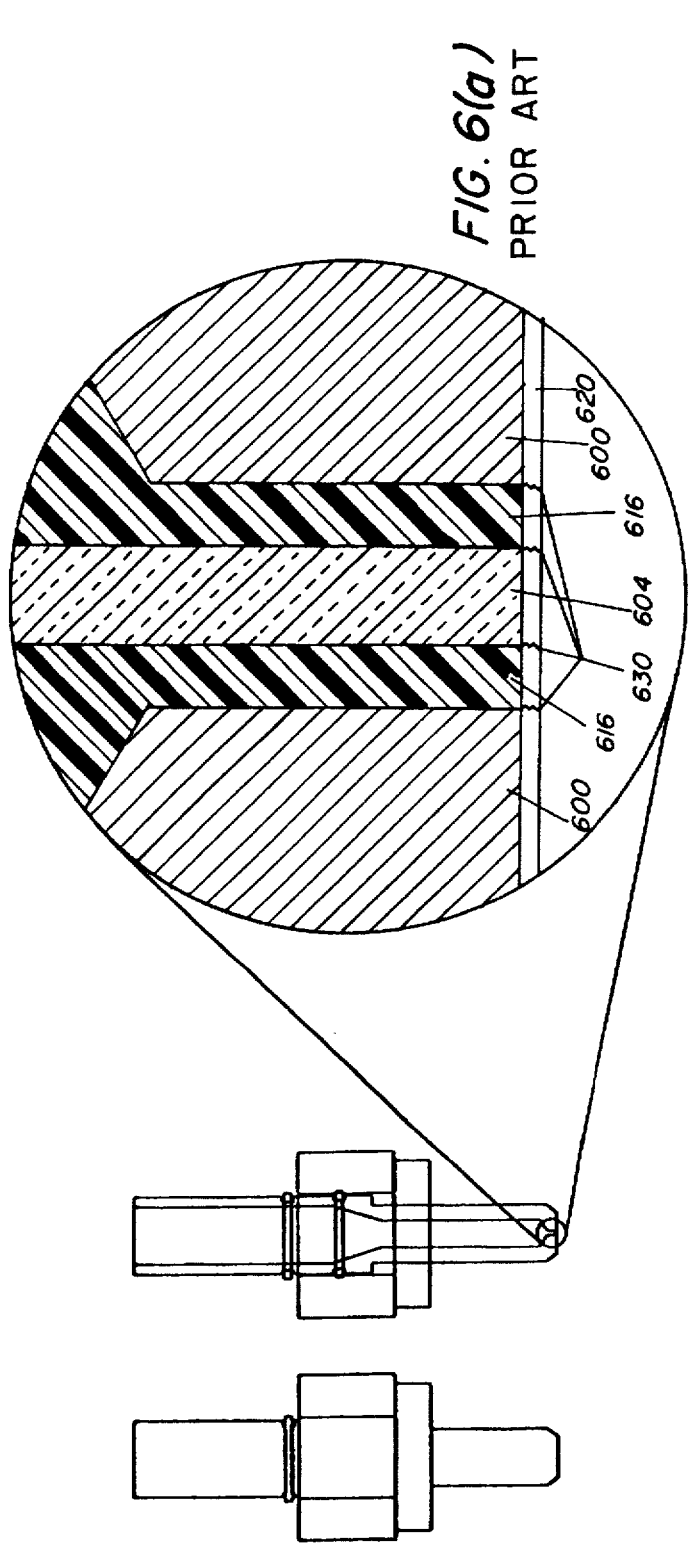
FIGS. 6(a) and 6(b) illustrate side and end views of the prior art practice of providing a material around an end of an optical fiber when providing end termination.

An annular air gap around the lower fiber extremity endface solves the prior art problems of fiber connector integrity during high optical power propagation and fiber antireflection coating integrity. For instance, a glass clad chalcogenide fiber 330 microns in outer diameter with a core of 200 microns was terminated by providing an annular air gap 506 around its endface 504', as shown in FIG. 5(b). No change in transmission through the fiber and no damage to the endface was realized when the fiber endface was irradiated for over one hour with 7.3 watts of incident carbon monoxide laser power at 5.4 microns. The input power was the maximum available from the laser, with power density of 121 $kW/cm^2$.

Therefore, although any fiber propagating any power can be terminated in the manner described herein, this invention is particularly appropriate for applications where a fiber is propagating sufficient power to melt or degrade a material at its lower extremity. The minimum power that a sulfide fiber of 200-micron core diameter can propagate without damaging material surrounding its lower extremity is believed to be about 2 watts, more typically about 3 watts.

Optical fibers of high refractive index require antireflective coatings on their endfaces to reduce reflection losses. For instance, a chalcogenide fiber having a refractive index of 2.4, has reflection loss of 17% per surface. An antireflective coating about 2 microns in thickness can reduce the reflection loss from 17% to less than about 1% per surface. An antireflective coating process usually requires the fiber ends to be heated to elevated temperatures. Due to differences in the coefficient of thermal expansion between the fiber and the surrounding second material in a prior art connector, upon cooling to room temperature, the antireflective coating may crack and flake away. With no second material in contact with the outer surface of the fiber ends, this effect does not occur and the coating remains intact.

FIG. 7(a) is a side view of the lower portion of the connector characterized by optical fiber 704 disposed in cylinder 700 separated by annular air gap 706 therebetween. Antireflective coating 720 was disposed on the end annular surface 700' of cylinder 700 and the endface 704' of fiber 704. Application of the same proprietary antireflection coating 720 in a similar way as in the case of the prior art connector, which produced similar heating of fiber 704, produced no cracking of the antireflective coating, as shown in FIG. 7(b), due to the presence of the air gap 706.

Having described the invention, the following example is given as a particular embodiment of the invention and to demonstrate the practice and advantages thereof. It is understood that the example is given by way of illustration and is not intended to limit the specification or the claims in any manner.

EXAMPLE 1

This example demonstrates termination of a chalcogenide fiber using the connector type of FIG. 2 which was about 2.3 cm in total length with cylinder 210 being 4.3 mm and cylinder 200 being 3.2 mmm outside diameter. Chamber 202 was about 1500 microns in diameter below nut 209 and was uniform throughout its length to frusto-conical section 208 which reduced chamber width to about 250 microns at passage 206. Inlet port 211 was 1.1 mm in diameter and exit port 212 was 330 microns. The exit port 212 was about 3.5 mm above lower surface 200' of cylinder 200. The fiber core was $As_{40} S_{68} Se_2$, its cladding was $As_{40} S_{60}$, and the fiber had on its outside surface an outer Teflon FEP coating. The fiber core diameter was 130 microns, the fiber cladding outside diameter was 220 microns, and the outside coating was 15 microns thick. At the end of the fiber that was being terminated, 5 mm of the Teflon coating was removed with a razor blade.

In preparation for carrying out the in-situ termination process of this invention, 10 grams of phenyl salicylate were placed into a glass dish and the glass dish was heated for about 3 minutes on a hot plate to 60° C. until the phenyl salicylate melted. Phenyl salicylate was the first material.

Pursuant to the in-situ process depicted by FIGS. 4(a), 4(b) and 4(c), fiber 404 with its leading stripped end was passed through chamber 413 into chamber 402 of cylinder 400 to a level where its lower surface 404' was below lower surface 400' of cylinder 400 so that about 2 mm of fiber 404 was protruding from the lower end of the connector. The lower end of the connector was dipped into the molten phenyl salicylate to a level where port 412 was well above the level of phenyl salicylate. When the lower end of the connector was in the molten phenyl salicylate, phenyl salicylate was drawn along the fiber into chamber 402 by capillary action. Before the molten phenyl salicylate reached the internal level of port 412, the connector, with the fiber inside, was removed from the molten phenyl salicylate and phenyl salicylate in and around the lower extremity solidified in about 30 seconds at room temperature, forming solid bead 414' around the lower extremity of fiber 404 and around the lower extremity of the connector. At this point, the fiber extended about 2 mm below the connector, as illustrated in FIG. 4(b).

Remainder of chamber 402 was then slowly filled with room temperature curable liquid epoxy Tra-Bond F112 (second material) through a syringe inserted into port 411. Care was taken not to contact fiber 404 with the syringe, to avoid fiber breakage. The epoxy was filled via port 411 and not via the open end of chamber 410 because when making a cable assembly with this type of connector, access to the open end of chamber 410 is limited. When filling chamber 402 with the liquid epoxy, disposition of the connector was such that the lower extremity of the connector was pointing downwardly, as shown in FIG. 4(b), to allow the epoxy to slowly flow down into chamber 402 and around fiber 404 while air trapped in the chamber 402 escaped through port 412. The connector was deemed full when the epoxy extruded through port 412.

After filling chamber 402 with the epoxy, the connector is set on its side with ports 411, 412 pointing up and the epoxy in the chamber is allowed to cure. Curing of the epoxy to a solid at room temperature took 12 hours. After curing, epoxy bead protruding from port 412 was removed by filing.

After the epoxy solidified in chamber 402, which anchored fiber 404 firmly in the connector, the solidified bead of phenyl salicylate 414 ' and the endface 404' of fiber 404 were polished, as well as the lower extremity 400' of cylinder 400, using a Buehler Fibrmet Optical Fiber Polishing Unit. Polishing was done in three stages, starting with 12-micron grit, then moving to 3-micron grit, and finishing with 0.3-micron grit aluminum oxide abrasive pads, while rinsing with deionized water. Polishing was continued until endface 404' of fiber 404 and the solidified bead 414' of phenyl salicylate 414 were flush with lower surface 400' of cylinder 400. Total polishing time was about 15 minutes.

Removal of the solidified phenyl salicylate from the connector was done with a combination of heat, solvent, and sonic energy. Using an ultrasonic bath, the bath containing deionized water was heated to 60° C. and a small beaker containing acetone was placed into the water bath in order to heat acetone. Acetone was allowed to heat up in the water bath and then the lower extremity of the connector with solidified phenyl salicylate was placed into the beaker containing acetone. At this point, the ultrasonic bath was turned on for 5 minutes and the solid phenyl salicylate dissolved and was removed from around the lower extremities of the fiber and the connector. The lower extremity of the connector was removed from acetone and the connector was then cleaned with dry methanol. After allowing methanol to evaporate in about 2 seconds, a product was obtained of an optical fiber encapsulated in the epoxy within a chamber of a connector wherein an annular air gap surrounded the fiber within the connector.

While presently preferred embodiments have been shown of the invention disclosed herein, persons skilled in this art will readily appreciate that various additional changes and modifications may be made without departing from the spirit of the invention as defined and differentiated by the following claims.

What is claimed is:

1. An optical fiber termination connector comprising a structure defining an elongated chamber open at both ends, said structure having first and second extremities; an optical fiber disposed in said chamber spaced from said structure and being flush with said structure at its first extremity; a material in solid form disposed in said chamber between said fiber and said structure; an air gap between said fiber and said structure in the chamber at the first extremity of said structure, said air gap is large enough to allow for independent thermal expansion of said fiber relative to thermal expansion of said structure surrounding and spaced from said fiber; an exit port in communication with the chamber in said structure near but removed from the first extremity of said structure; and an inlet port in communication with the chamber in said structure spaced from said exit port in the direction of the second extremity of said structure.

2. The connector of claim 1 wherein the air gap between said fiber and said structure is annular.

3. The connector of claim 2 wherein the first extremity of said structure is a frusto-conical section which reduces diametrical extent of the chamber in the direction of the first extremity of said structure.

4. The connector of claim 3 wherein the minimal space between said fiber in the chamber in said frusto-conical section of said structure is a passage of sufficient width to draw a liquid by capillary action along said structure into the chamber when the first extremity of said structure is dipped into a material in liquid form.

5. The connector of claim 4 wherein said structure is of steel; diameter of the chamber is 100–3000 microns; outside diameter of said fiber is 100–1000 microns; the air gap extends along and around said fiber for a vertical distance of 200–2000 microns from lower extremity of said structure; exit port is 100–500 microns in diameter; and inlet port is 500–2500 microns in diameter.

6. The connector of claim 5 wherein said fiber is selected from the group consisting of silica fibers, chalcogenide fibers, fluoride fibers, polycrystalline fibers, single crystal fibers, and plastic fibers.

7. The connector of claim 6 wherein said fiber is cylindrical comprising chalcogenide core and chalcogenide cladding surrounding said core, wherein core diameter is 30–70% of the outside diameter of said fiber.

8. The connector of claim 7 wherein the second material is solid epoxy and the product further includes an antireflection coating on the endface of said fiber in the vicinity of said air gap.

9. The connector of claim 4 wherein said structure is of metal; inner diameter of the chamber is 50–5000 microns; outside diameter of said fiber 50–2000 microns; the air gap extends along and circumferentially around said fiber for a vertical distance of 50–5000 microns from lower extremity of said structure; exit port is 50–1000 microns in diameter; and inlet port is 100–4000 microns in diameter.

10. A process for making an optical fiber termination connector comprising the steps of:
 (a) locating a fiber having an endface within and spaced from walls of an elongated chamber, the fiber having first and second ends, the first end of said fiber extending beyond one end of the chamber;
 (b) with the chamber disposed in a vertical plane, filling lower portion of the chamber and coating the lower portion of the fiber and the chamber in the vicinity of the first end thereof with a first material in liquid form;
 (c) solidifying the first material around the lower portion of the fiber and in and circumferentially around the lower portion of the chamber;
 (d) flowing into the chamber on top of the solid first material around the fiber a second material in liquid form;
 (e) solidifying the second material around the fiber in the chamber above the solid first material;
 (f) polishing the endface of the fiber at its lower extremity and the solid first material surrounding the fiber until the endface of the fiber is flush with the lower extremity of the chamber; and
 (g) removing the first material around the lower portion of the fiber in the vicinity of the first end thereof and in and circumferentially around the lower portion of the chamber to form an air gap between the lower portion of the fiber and the lower portion of the chamber large enough to allow for thermal expansion of the fiber.

11. The process of claim 10 wherein the first material has liquid and solid phases and can be converted from liquid to solid and from solid to liquid, whereas the second material has liquid and solid phases and can be converted from liquid to solid.

12. The process of claim 11 wherein said step of filling the lower portion of the chamber and coating the lower portion of the fiber in the vicinity of the first end thereof and outside of lower portion of the chamber with the first material is accomplished by dipping the lower portion of the chamber in the first material in liquid form.

13. The process of claim 12 wherein said step of flowing the second material into the chamber is accomplished by injecting the second material through an inlet port and exhausting air trapped in the chamber through an exit port located below the inlet port but above the level of solidified first material.

14. The process of claim 13 wherein the first material is solid at room temperature and converts to a liquid above room temperature but below 100° C. and the second material converts to solid form at room temperature.

15. The process of claim 14 wherein the step of filling the lower portion of the chamber with the first material proceeds by capillary action to a level at or below an exit port in the lower portion of the chamber provided for exhausting air from the chamber, and the step of flowing the second material is carried out by injecting the second material in liquid form through an inlet port located above the exit port.

16. The process of claim 15 wherein the fiber is selected from the group consisting of silica fibers, chalcogenide fibers, fluoride fibers, polycrystalline fibers, single crystal fibers, and plastic fibers.

17. The process of claim 16 wherein the step of solidifying the first material is accomplished by reducing temperature of the first material, wherein the step of solidifying the second material is accomplished by curing it at room temperature, and wherein the first material is phenyl salicylate and the second material is a room-temperature curable epoxy.

18. The process of claim 17 including the step of applying an antireflection coating to the endface of the fiber after polishing same.

19. The process of claim 17 including the steps of gelling the second material at room temperature and; after removal of the first material, curing the second material at a high temperature that is less than the softening temperature of said fiber.

20. The process of claim 11 wherein the the second material is thermosetting.

* * * * *